Aug. 22, 1944. G. C. R. BIRCH 2,356,442
PRESSURE GAUGE
Filed July 9, 1943 2 Sheets-Sheet 1

Inventor
G. C. R. BIRCH
By
Emery Holcombe Blair
Attorneys

Aug. 22, 1944.  G. C. R. BIRCH  2,356,442
PRESSURE GAUGE
Filed July 9, 1943  2 Sheets-Sheet 2

Inventor
G.C.R. BIRCH
By
Attorney

Patented Aug. 22, 1944

2,356,442

UNITED STATES PATENT OFFICE 2,356,442

PRESSURE GAUGE

George Christian Ross Birch, Raynes Park, England, assignor to B. & R. Patents Limited, London, England, a company of Great Britain Application July 9, 1943, Serial No. 494,046
In Great Britain July 7, 1942

8 Claims. (Cl. 73—109)

This invention relates to fluid pressure gauges capable of measuring high pressures of several atmospheres and also pressures considerably below atmospheric pressure.

An object of the invention is to provide a simple and efficient instrument of this kind which will have a good wide-open scale throughout the useful pressure and vacuum ranges for which the instrument is designed to operate, without the necessity of operating any transfer devices to change from one scale to the other.

A further object of the invention is to provide a gauge comprising a Bourdon tube fixed to a supporting base at one end of the tube which communicates with the fluid source whose pressure is to be measured, a flexible bellows communicating at one end with the free end of the said tube and supported thereby, a cage surrounding the bellows and supported by the free end of the tube, means on said cage adjacent to the free end of the bellows and acting to prevent expansion thereof beyond a predetermined limit, an indicating device carried by said supporting base, and means operatively connecting the free end of the bellows to the indicating device.

Figure 1:
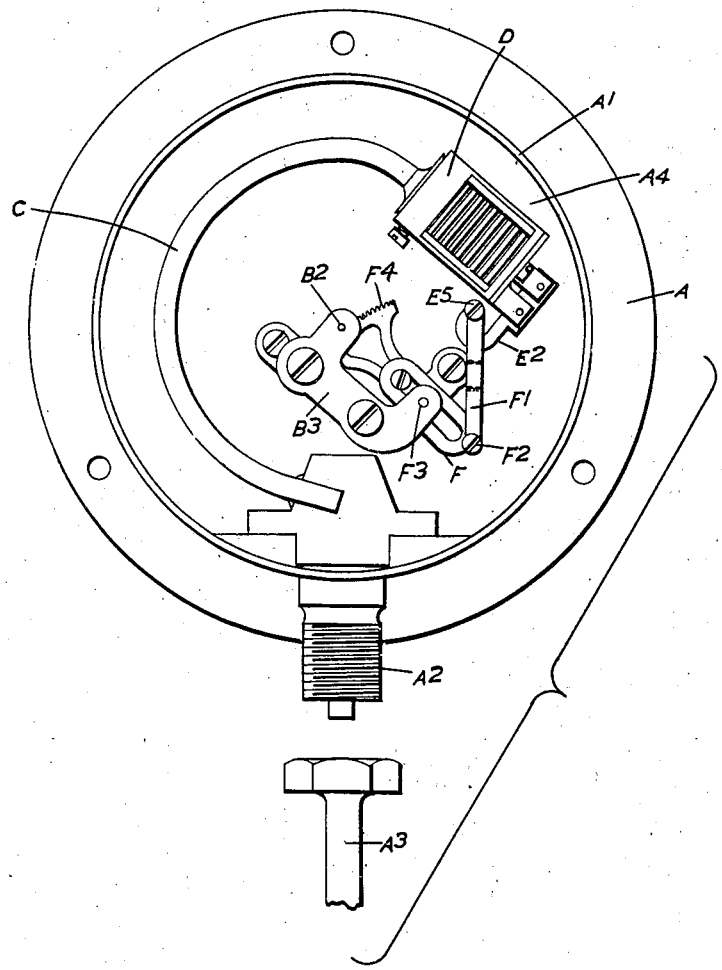
Figure 2:
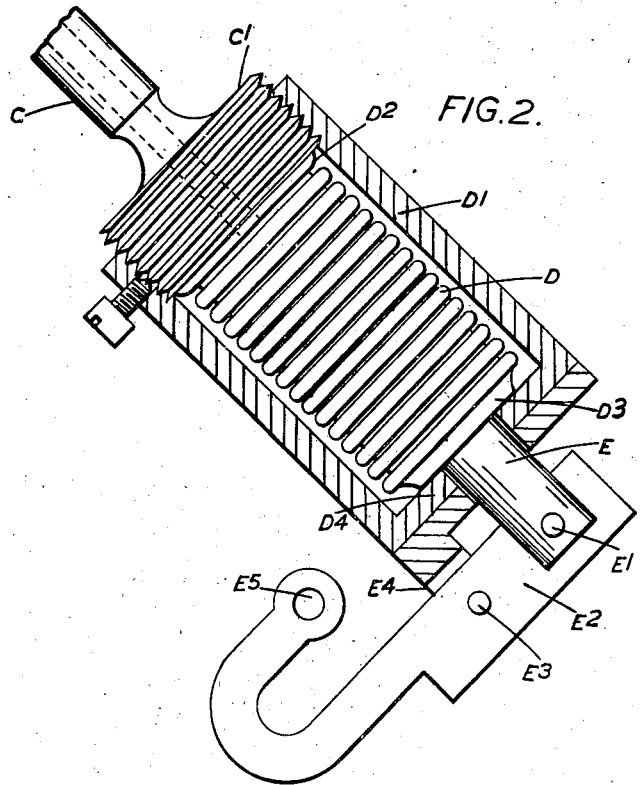
Figure 3:
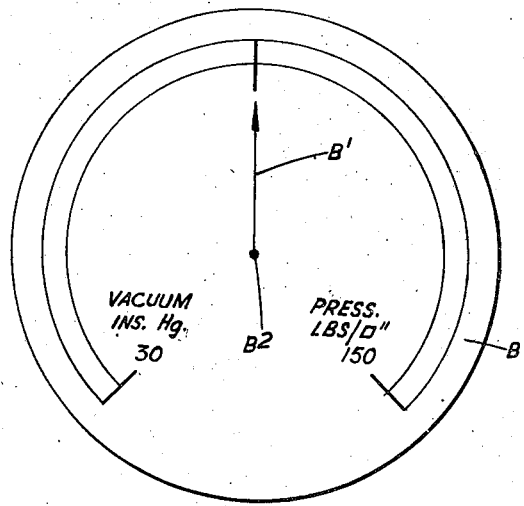

One embodiment of the invention is illustrated by way of example in the accompanying drawings, in which Figure 1 is a front view, with the front cover plate and indicating dial removed, Figure 2 illustrates in section and on an enlarged scale, the arrangement of the bellows and cooperating cage, and Figure 3 shows the dial on the same scale as that of Figure 1.

In the construction shown, the gauge comprises a supporting base or casing A having a dial B on its front surface over which the pointer $B^1$ moves, the dial B having a centre zero corresponding to atmospheric pressure with pressure graduations on the right and vacuum graduations on the left as viewed in Figure 1.

Beneath the dial B is a chamber $A^1$ containing the working parts of the gauge, a pipe joint $A^2$ being provided, in the wall of the chamber $A^1$, to which can be connected the pipe $A^3$ leading to the fluid source whose pressure or suction is to be measured.

The fixed end of a Bourdon tube C is connected to the pipe joint $A^2$ so that the interior of the tube C communicates with the pipe $A^3$. The tube C may be made of phosphor bronze or other suitable material and has a thickness suited to the range of high pressure for which the gauge is intended, the tube C being curved in the usual manner into an arcuate shape, so that it will tend to straighten out slightly when subjected to high pressure and to curve more strongly when the pressure within it falls. The tube C partially encircles the axis of rotation, that is to say, the spindle $B^2$ of the indicating pointer $B^1$.

At its free end, the Bourdon tube C is provided with a screw threaded boss $C^1$ (Figure 2) on to which is screwed a cylindrical cage or protective structure $D^1$. A flexible metal bellows D is housed within the cage $D^1$ and has one end attached in a fluid-tight manner, as indicated at $D^2$, to the adjacent end of the boss $C^1$ which is bored to provide communication between the Bourdon tube C and the interior of the bellows D. The other end $D^3$ of the bellows D is closed, and the bellows D and cage $D^1$ are so dimensioned that when the interior of the bellows is at atmospheric pressure, the free end $D^3$ of the bellows will just bear against the end wall $D^4$ of the cage $D^1$. An operating rod E, carried by the closed free end $D^3$ of the bellows, extends through a hole in the end wall $D^4$ of the cage $D^1$ and is pivotally connected at $E^1$ to one end of a floating lever $E^2$ fulcrumed at $E^3$ on a lug $E^4$ carried by the cage $D^1$. The other end of the lever $E^2$ is connected at $E^5$ to one end of a floating link $F^1$ whose other end is pivotally connected at $F^2$ an adjustable lever F mounted to swing about a pivot $F^3$ carried by a bracket $B^3$ secured to the back plate $A^4$ of the gauge casing and providing bearings for the spindle $B^2$ of the pointer $B^1$. The spindle carries a pinion (not shown) which is engaged by a segmental rack $F^4$ operated by the actuating lever F.

The mechanism is chosen and adjusted to give a more or less uniform movement of the pointer $B^1$ throughout the desired range on each side of the centre zero position, but it will usually be convenient to have different scales of movement on the two sides of the zero, so that, for example, on the pressure side there may be a more or less uniform scale from one atmosphere up to, say, ten atmospheres, whilst on the vacuum side a scale of similar length will cover the pressures below one atmosphere.

In operation, it will be clear that an applied pressure or suction will affect both the Bourdon tube C and the bellows D. In the case of a pressure above atmospheric, the bellows D will be held by the cage $D^1$ in its normal expanded position, and the bellows will be unable to expand further. The bellows D and the cage $D^1$ then merely constitute an inoperative fitting attached to the end of the Bourdon tube C, and the operative movements transmitted to the pointer B¹ will thus be wholly due to the straightening tendency of the tube C. This straightening tendency will exert a pull through the floating lever E² and link F¹ on the indicator actuating lever F and will thus move the pointer B¹ to the right as viewed in Figure 3, that is to say, on the pressure side of the dial B, through an angle dependent upon the straightening movement of the tube C and therefore on the applied pressure.

In the case of an applied suction, the bellows D will contract within the cage D¹. The tube C will, however, make only a very small inward movement, since the absolute pressure change throughout the whole range of possible suction values will be equal to only a small fraction of the pressure change for which the gauge is calibrated on the pressure side. Moreover, since the bodily movement of the floating lever E², due to such small inward movement of the cage D, will be transverse to the length of the link F¹, the effect on the indicator actuating lever F due to this slight movement will be small. The link F¹ extends tangentially to a circle coaxial with the pivot axis of the floating lever E², the contracting movement of the bellows D and consequent angular movement of the floating lever E² will act through the link F¹ to turn the indicator actuating lever F so that the pointer moves to the left, as viewed in Figure 3. The operative movements transmitted to the pointer B¹ thus depend almost entirely on the contraction of the bellows D.

It will thus be clear that the calibration of the dial on the vacuum side will depend on the bellows construction and will be almost independent of the Bourdon tube, whilst the calibration on the pressure side will depend on the Bourdon tube construction and will be independent of the bellows. It is thus possible to have more or less uniform calibration on each side of the centre position but on different scales on the two sides, as shown in Figure 3, and this enables a wide open scale to be used on the vacuum side and a similar wide open scale covering a much larger absolute pressure range on the pressure side.

What I claim as my invention and desire to secure by Letters Patent is:

1. In a fluid pressure gauge for giving both high pressure and vacuum measurements, in combination, a supporting base, a Bourdon tube fixed at one end to said base, means carried by the base whereby the fixed end of the tube communicates with the fluid source whose pressure is to be measured, a flexible bellows carried by the free end of the tube and communicating at one end therewith, the other end of said bellows being closed, a cage carried by the free end of the tube and surrounding the bellows, said cage having an end part adjacent to the closed end of the bellows for preventing expansion thereof beyond a predetermined limit, an indicating device carried by the base, and means operatively connecting the closed end of the bellows to the indicating device.

2. In a fluid pressure gauge for giving both high pressure and vacuum measurements, in combination, a supporting base, a Bourdon tube fixed at one end to said base, means carried by the base whereby the fixed end of the tube communicates with the fluid source whose pressure is to be measured, a flexible bellows, a device connecting one end of the bellows to the free end of the tube and establishing communication between the tube and the interior of the bellows whose other end is closed, a cage surrounding the bellows and supported at one end by said connecting device, the other end of the cage lying adjacent to the closed end of the bellows and preventing expansion thereof beyond a predetermined limit, an indicating device carried by the supporting base, and means operatively connecting the closed end of the bellows to said indicating device.

3. In a fluid pressure gauge for giving both high pressure and vacuum measurements, in combination, a supporting base, a Bourdon tube fixed at one end to said base, means carried by the base whereby the fixed end of the tube communicates with the fluid source whose pressure is to be measured, a flexible bellows carried by the free end of the tube and communicating at one end therewith, the other end of the bellows being closed, a cage carried by the free end of the tube and surrounding the bellows, said cage having an end part adjacent to the closed end of the bellows for preventing expansion thereof beyond a predetermined limit, a fulcrum carried by the cage, a lever mounted to turn on said fulcrum, a rod carried by the closed end of the bellows and pivotally connected to one end of said lever, an indicating device pivotally mounted on the supporting base, and means connecting the indicating device to the other end of said lever.

4. In a fluid pressure gauge for giving both high pressure and vacuum measurements, in combination, a supporting base, a Bourdon tube fixed at one end to said base, means carried by the base whereby the fixed end of the tube communicates with the fluid source whose pressure is to be measured, a flexible bellows, a device connecting one end of the bellows to the free end of the tube and establishing communication between the tube and the interior of the bellows whose other end is closed, a cage surrounding the bellows and supported at one end by the said connecting device, the other end of the cage lying adjacent to the closed end of the bellows and preventing expansion thereof beyond a predetermined limit, a fulcrum carried by the cage, a lever mounted to turn on said fulcrum, a rod carried by the closed end of the bellows and extending freely through the cage, a pivot connecting the rod to one end of the said lever, an indicating device pivotally mounted on the supporting base, and means connecting the indicating device to the other end of said lever.

5. In a fluid pressure gauge for giving both high pressure and vacuum measurements, in combination, a supporting base, a Bourdon tube fixed at one end to said base, means carried by the base whereby the fixed end of the tube communicates with the fluid source whose pressure is to be measured, a flexible bellows carried by the free end of the tube and communicating at one end therewith, the other end of the bellows being closed, a cage carried by the free end of the tube and surrounding the bellows, said cage having an end part adjacent to the closed end of the bellows for preventing expansion thereof beyond a predetermined limit, a fulcrum carried by the cage, a lever mounted to turn on said fulcrum, a rod carried by the closed end of the bellows and extending freely through the cage, a pivot connecting the rod to one end of said lever, an indicating device pivotally mounted on the supporting base, and a floating link connecting the indicating device to the other end of the said lever, the floating link extending transversely to the path of movement of said fulcrum due to bodily movement of the free end of the tube, and substantially tangentially with respect to a circle coaxial with the said fulcrum.

6. In a fluid pressure gauge for giving both high pressure and vacuum measurements, in combination, a supporting base, a Bourdon tube fixed at one end to said base, means carried by the base whereby the fixed end of the tube communicates with the fluid source whose pressure is to be measured, a flexible bellows, a device connecting one end of the bellows to the free end of the tube and establishing communication between the tube and the interior of the bellows whose other end is closed, a cage surrounding the bellows and supported at one end by said connecting device, the other end of the cage lying adjacent to the closed end of the bellows and preventing expansion thereof beyond a predetermined limit, a fulcrum carried by the cage, a lever mounted to turn on said fulcrum, a rod carried by the closed end of the bellows and extending freely through the cage, a pivot connecting the rod to one end of the said lever, an indicating device pivotally mounted on the supporting base, and a floating link connecting the indicating device to the other end of the said lever, the floating link extending tangentially with respect to a circle coaxial with the fulcrum, and transversely with respect to the path of bodily movement of the fulcrum due to bodily movement of the free end of the tube.

7. In a fluid pressure gauge for giving both high pressure and vacuum measurements, in combination, a casing having a supporting base, a Bourdon tube fixed at one end to said base, a screwthreaded coupling carried by the base whereby the fixed end of the tube communicates with the fluid source whose pressure is to be measured, a flexible bellows, a device having an external screwthread and connecting one end of the bellows to the free end of the tube, said connecting device establishing communication between the tube and the interior of the bellows whose other end is closed, a cage surrounding the bellows and having at one end an internal screwthread which engages the screwthread on the connecting device, said casing having a wall at the other end lying adjacent to the closed end of the bellows thereby preventing expansion thereof beyond a predetermined limit, a fulcrum carried by the cage, a floating lever mounted to turn on said fulcrum, a rod carried by the closed end of the bellows and extending freely through the end wall of the cage, a pivot connecting the rod to one end of said floating lever, an indicating pointer, a dial carried by the casing and having two graduated scales on opposite sides of a zero respectively, a spindle carrying said pointer and rotatable in bearings carried by the base, a pinion carried by the spindle, an actuating lever mounted to pivot on the base, a toothed quadrant at one end of said actuating lever and engaging the pinion, and a floating link pivotally connected at opposite ends respectively to the actuating lever and floating lever, the link extending tangentially with respect to a circle coaxial with the fulcrum and transversely with respect to the path of bodily movement of said fulcrum due to movement of the free end of the tube.

8. In a fluid pressure gauge for giving both high pressure and vacuum measurements, in combination, a supporting base, a Bourdon tube fixed at one end to the said base, means carried by the base whereby the fixed end of the tube communicates with the fluid source whose pressure is to be measured, a flexible bellows, a plug-like connecting device having an external screwthread and connecting one end of the bellows to the free end of the tube, said connecting device establishing communication between the tube and the interior of the bellows whose other end is closed, a cage surrounding the bellows and having at one end an internal screwthread which engages the external screwthread of the connecting device, said casing having a wall at the other end lying adjacent to the closed end of the bellows thereby preventing expansion thereof beyond a predetermined limit, an indicating device carried by the supporting base, and means operatively connecting the indicating device to the closed end of the bellows.

GEORGE CHRISTIAN ROSS BIRCH.